INVENTORS
Benjamin K. C. Shim,
Donald R. Blenner,
Thomas J. Dudek &
William F. Hafner INVENTORS
Benjamin K. C. Shim,
Donald R. Blenner,
Thomas J. Dudek &
William F. Hafner INVENTORS
Benjamin K. C. Shim
Donald R. Blenner
Thomas J. Dudek
William F. Hafner United States Patent Office 3,634,299
Patented Jan. 11, 1972

3,634,299
DAMPING COATINGS AND METHODS FOR PREPARATION
Benjamin K. C. Shim, Donald R. Blenner, Thomas J. Dudek, and William F. Hafner, all c/o Lord Corporation, Erie, Pa.
Continuation-in-part of application Ser. No. 569,190, Aug. 1, 1966. This application Apr. 9, 1969, Ser. No. 839,744
Int. Cl. C08f 45/04, 45/40
U.S. Cl. 260—31.8
11 Claims

ABSTRACT OF THE DISCLOSURE

A damping material is provided which comprises in combination with a material imparting stiffness thereto a polymeric material having polar functionality and in the solid state clearly defined spaced apart glass and secondary transition points admixed with a plasticizer which moves the transition points together to provide a combined transition effect.

---

This application is a continuation-in-part of my copending application Ser. No. 569,190, filed Aug. 1, 1966, now abandoned.

This invention relates to damping coatings and methods of preparation and particularly to polymeric materials used as damping coatings or cores for rigid metal, plastic and other structural materials to control resonant vibration and to methods for preparing such coatings.

Damping treatments, which employ polymeric materials to dissipate mechanical vibration energy, are used to control the resonant response of flexural surfaces. They attenuate or eliminate the radiation of disturbing noise from vibrating surfaces and the transmission of undesirable vibrations, and increase the fatigue life of structural materials.

One commonly used damping method involves coating the surface of the metal or material to be damped with a polymeric damping material. Damping materials used in this way have been called extensional damping materials and are usually characterized by high values of their dynamic loss moduli, $E''$, at the temperatures and frequencies of interest. The theoretical analysis of the resonance response of a cantilever beam coated with a viscoelastic damping material is well known. It has been found that the loss factor (the ratio of the energy dissipated to energy stored per vibration cycle) of the composite beam for practical cases (involving the application of coatings of low weight) is primarily a function of the ratio of the loss modulus of the viscoelastic material to the storage modulus of the metal (or non-lossy material) and the ratio of the thicknesses of damping material and metal. Hence, if the dynamic properties of the damping material are known as a function of frequency and temperature it is possible to compute the dynamic behavior of a coated bar of any length. The theory has been used to guide the development of damping materials for thin plates and other more complicated structures.

In the present state-of-the-art it is possible to adjust to a limited degree the position of peak damping at any desired temperature and frequency. However, the temperature and frequency ranges over which high damping obtains have been limited because of the limited temperature and frequency bandwidths of the loss moduli of damping materials available until the present time. This temperature bandwidth limitation together with the requirement for low added weight has limited the areas of application for additive damping treatments in aircraft, missiles, rapid transit, ships, refrigeration units, home appliances and machine enclosures.

Another structural damping method presently in use employs viscoelastic polymeric materials laminated between skins of metal, plastic and other structural material. Polymers used in this manner are referred to as constrained layer damping materials. The relationship between the loss factor of the composite laminate and the viscoelastic properties of the core material and the geometry of the laminate are slightly more complicated compared to the extensional damping case, but the theoretical analysis has been developed for computing the dynamic properties of the sandwich structure if the properties of the viscoelastic core are known. Polymeric materials for this application should, in general, have a high loss factor over the broadest possible temperature and frequency range. It is also possible to match the elastic shear modulus with the laminate geometry to optimize damping.

Heretofore, characterization of damping materials have been obtained directly through the loss behavior observed in dynamic mechanical testing. The latter have involved torsion pendulum, complex modulus bending wave equipment, dynamic mechanical spectrometers, and the like. To our knowledge, there has been no use of D.C. electrical conductivity measurements to characterize potential damping materials.

The use of dielectric methods to study potential mechanical damping capability in a polymer has been limited to date. This has arisen because attempts at direct correlation of dielectric data with dynamic mechanical results have been successful in only a few cases. We have discovered certain techniques and parameters of dielectric measurements and values which provide a uniquely advantageous measure of the damping efficiency of polymeric materials.

We have also discovered certain polymeric materials which have unusual damping efficiency, particularly as extensional damping coatings, and are far superior to the materials of the prior art. These materials also have superior properties in constrained layer damping application but to a less marked degree than is the case in extensional damping coatings. However, it should be pointed out that in both extensional and constrained layer applications the materials of this invention are far superior to materials heretofore available.

In damping applications such as are here being considered, it is important to have a broad temperature and frequency range of damping. One of the problems of prior art damping materials has been the lack of high levels of damping over such broad temperature and frequency range.

The relatively small temperature bandwidth of the vibration damping materials hitherto known—about 54° F. when taking the reference value $\eta_c = .1(m_2/m_.=.3)$— is a decisive disadvantage for a great number of industrial applications. The need for improved damping materials is particularly evident in the field of modern transportation, for example automobiles, airplanes, railroad cars, etc. Such vehicles are presently treated with damping materials whose maximum effect is adjusted to room temperature (70° F.). When operating these vehicles on cold winter days (for example −10° F.) or in hot zones (for example with an external temperature of 100° F.), the vibration damping effect may be reduced to an inadmissible low level. It is quite obvious that, especially in the case of rapidly moving transport means, good vibration damping agents are required that cover wide ranges of temperature.

Another example is machinery having thin-walled plate constructions which heat up rapidly when in operation. A particularly good example of such machinery is the domestic washing-machine with thin-walled plate casings, the normal operating temperature of said machines being about 120° F. to 140° F. Since it is required that these machines operate noiselessly both when being started (at about 70° F.) and when in continuous operation, a vibration damping material to be satisfactory must cover the whole range of about 70° F. to 140° F. with its vibration damping effect. One alternative is to attempt a compromise solution for machines of this kind by applying a damping agent that is effective at a medium temperature within the desired range. For the range mentioned in the last example, the agent having its maximum effect at a temperature at 105° F. would have the greatest damping effect in the middle of the desired temperature band; however, it would remain unsatisfactory at the limits of the range, especially at the upper limit where the greatest need for vibration damping effect exists.

A particularly troublesome case exists in the modern airplane which may leave the ground at a temperature of 85° F. and in a matter of minutes to be at an elevation of 35,000 feet and temperatures of —40° F. In such cases materials of the prior art were completely unsatisfactory. The materials of this invention provide a much broader temperature and frequency range than can be obtained with conventional polymers used in damping applications and solve many of these heretofore impossible problems of damping vibration.

We have found that damping coatings and laminates based on polymers, derived from the monomers of the homologous methacrylate series yield compounds exhibiting high damping extensions over considerably greater temperature and frequency ranges than all other extensional damping materials known to us. Homopolymers of methacrylates and copolymers of monomers of the methacrylate series with other monomers, in particular, styrene, and physical blends of the homopolymers of methacrylate series and other homopolymers, in particular, polystyrene, have been found to have these superior damping properties. Polymers of methacrylic acid esters generally exhibit multiple damping mechanisms, a mechanical loss peak associated with motions of the backbone polymer chains, a secondary peak generally attributed to motions of the ester side chains. The two loss peaks are usually resolvable in the undiluted polymers, although portions of the peaks do overlap. This will not be obtained with polymers which do not possess secondary loss mechanisms. We have found that by the addition of plasticizer the main transition loss peak is shifted towards lower temperatures (measurements made at constant frequency) at a faster rate than the secondary peak and, at the plasticizer contents of interest for extensional damping applications, this results in an adding together of the two peaks to give a broad temperature bandwidth over which high damping can occur particularly in extensional damping applications.

Molecular structure and concentrations of specific plasticizers and fillers affect the temperature and frequency bandwidths of damping compounds. However, these effects appear to be separable from the polymer structure effects observed in the methacrylate series of polymers, which lead to the much higher effective temperature ranges for damping compounds formulated from these polymers. The methacrylate series of damping materials are therefore not restricted to any particular plasticizer or filler type.

Damping coatings are distinguished from conventional paint or protective coatings in that they must have a minimum thickness which is greater than ordinary paint coatings. Ordinary paint coatings are in the order of magnitude of dried film thickness of 0.001 inch to 0.002 inch whereas a minimum thickness for perceptible damping effectiveness is 0.01 inch.

As a measure of determining the relative effectiveness of damping coatings, a standard steel cantilever beam was coated on one side with the damping coating and the loss factor, $\eta_c$ of the composite was measured at various temperatures and frequencies using known techniques. At equal mass ratios of coating to metal (the ratio 0.3 has been used as a standard here), the coating claimed in this invention exhibit a composite loss factor of 0.1 or greater over a 69–86° F. temperature breadth as compared to a temperature breadth (defined in the same manner) of 45–50° F. for other known materials. They also exhibit a composite loss factor of 0.2 or greater over a 30°–35° F. temperature breadth as compared to 10–15° F. for other known materials.

These damping coatings are formulated in the following manner: Plastic materials are plasticized with a suitable plasticizer so as to position the region of maximum damping (associated with the glass transition) in the desired temperature and frequency range. (Dielectric loss and D.C. conductivity measurements can be used to rapidly determine the proper plasticizer content required to locate the temperature of peak damping.) Filler is then added to increase the dynamic loss modulus of the coating (a necessary requirement for unconstrained damping coatings). It also may be possible to use non-plasticized polymeric materials already having their maximum damping properties in the desired temperature and frequency region, by merely adding suitable fillers.

Damping materials based on methacrylic polymers but preferably formulated in a slightly different manner are also equally effective in constrained layer damping applications (3-ply laminates). Since lower moduli are often required for damping materials suitable for constrained layer damping treatments, they are formulated without filler or with fillers of such type and quantity as to provide the optimum modulus. Fillers are also added to broaden the temperature bandwith (at some loss in peak damping). Plasticizers are used in constrained layer damping applications to control the temperature of peak damping and the modulus.

The scope and subject matter of this invention will perhaps be more clearly understood by reference to specific examples of damping materials according to our invention and to the drawings in which.

We have prepared certain representative examples as illustrative and not as limitative of our invention which are set out hereinbelow.

EXAMPLE 1

| | Parts by wt. |
|---|---|
| 67/33 (methyl methacrylate-styrene) copolymer | 100 |
| Plasticizer, butyl benzyl phthalate | 60 |
| Dixon graphite 1101 | 150 |

Figure 1:
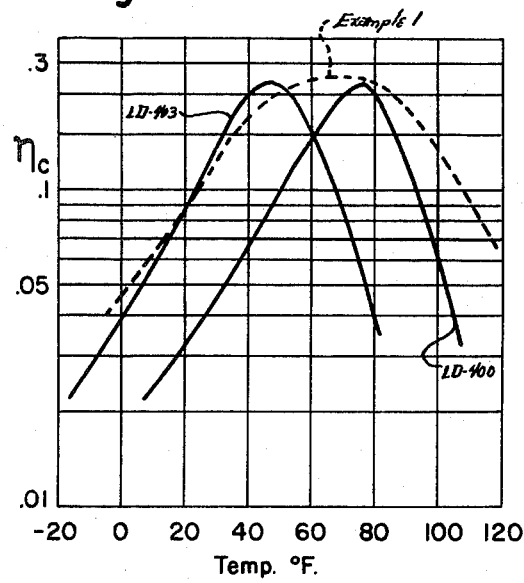
FIG. 1 shows a curve of composite loss factor versus temperature for a test bar coated with a composition according to this invention compared with like test bars coated with presently available damping agents.

The damping properties of this compound is shown in FIG. 1, and are there compared to typical commercial damping coatings presently in use and sold under the identities LD 400 and LD 403.

It will be noted from the comparative curves that the effective temperature bandwidth of the material according to our invention is broader than that of both prior art materials combined.

EXAMPLE 2

| | Parts by wt. |
|---|---|
| Polymethyl methacrylate | 100 |
| Plasticizer, butyl benzyl phthalate | 60 |
| Dixon graphite 1101 | 150 |

Figure 2:
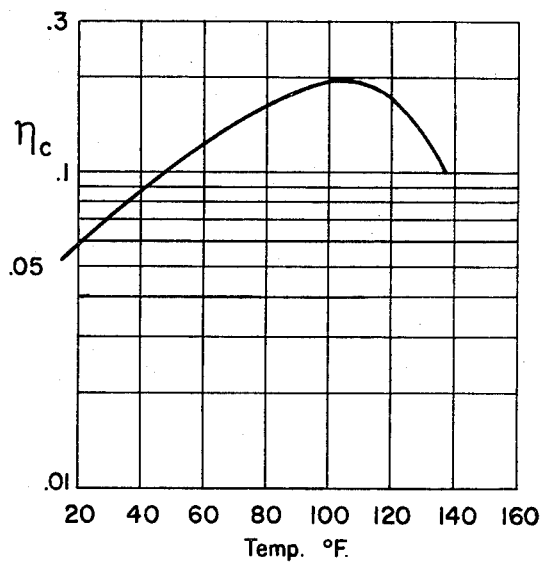
FIGS. 2–7 show curves of composite loss factor versus temperature for various compositions according to our invention.

FIG. 2 shows the damping properties of this formulation.

EXAMPLE 3

| | Parts by wt. |
|---|---|
| Polystyrene | 33 |
| Polymethyl methacrylate | 67 |
| Plasticizer, butyl benzyl phthalate | 60 |
| Dixon graphite 1101 | 150 |

Figure 3:
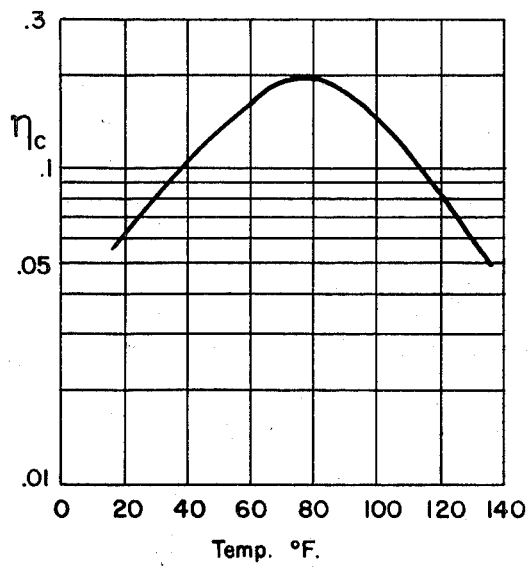

FIG. 3 shows the damping properties of the formulations.

EXAMPLE 4

| | Parts by wt. |
|---|---|
| Polyethyl methacrylate | 100 |
| Celluflex CEF plasticizer | 50 |
| Dixon graphite 1101 | 150 |

Figure 4:
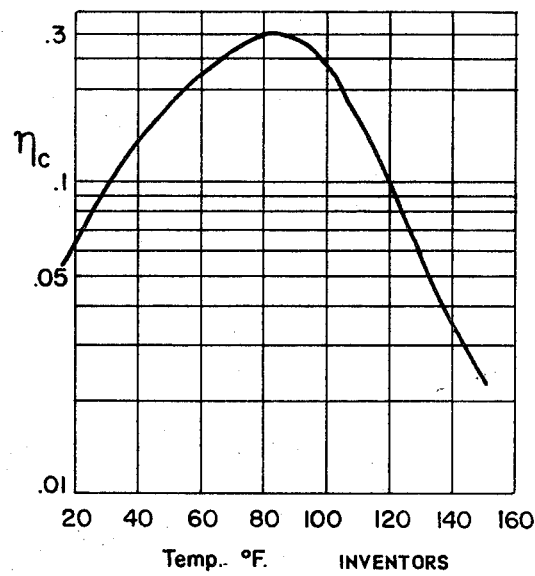

FIG. 4 shows the damping properties of this formulation.

EXAMPLE 5

| | Parts by wt. |
|---|---|
| 67/33 (methyl methacrylate-styrene) copolymer | 100 |
| Plasticizer, butyl benzyl phthalate | 60 |
| Vermiculite | 100 |
| Methylene chloride (volatile solvent) | 390 |

The foregoing example is illustrative of a compound for sprayable coating.

Figure 5:
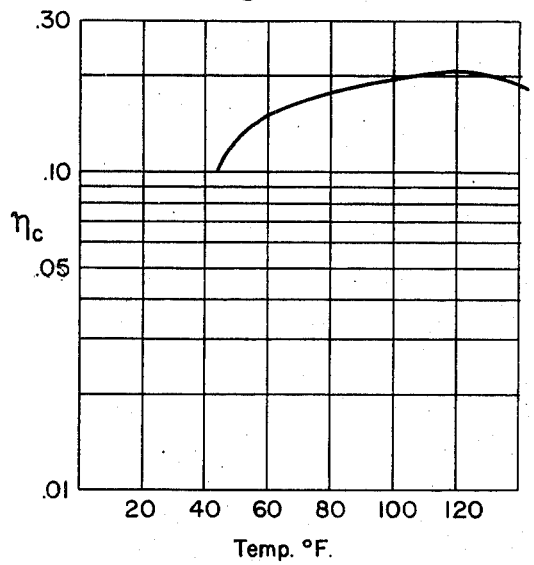

FIG. 5 shows the damping properties of this formulation.

EXAMPLE 6

| | Parts by wt. |
|---|---|
| Poly n-butyl methacrylate | 100 |
| Plasticizer butyl benzyl phthalate | 20 |
| Dixon graphite 1101 | 150 |

Figure 6:
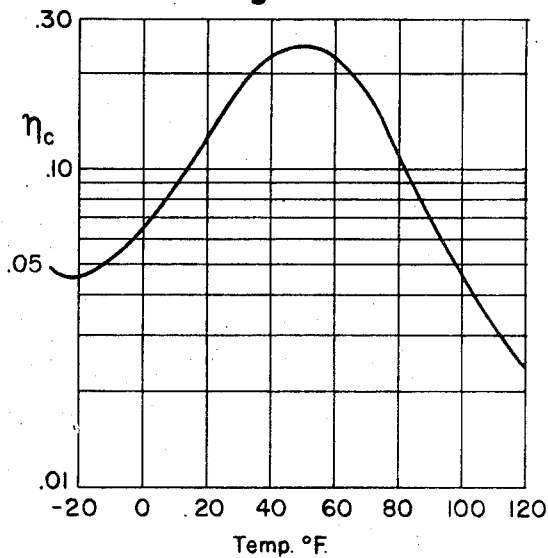

FIG. 6 shows the damping properties of this formulation.

The foregoing six examples are illustrative of materials particularly suitable for extensional damping applications. The following example shows a slightly modified composition particularly suitable for constained layer damping application.

EXAMPLE 7

| | Parts by wt. |
|---|---|
| 67/33 (methyl methacrylate-styrene) copolymer | 100 |
| Plasticizer, butyl benzyl phthalate | 60 |

Figure 7:
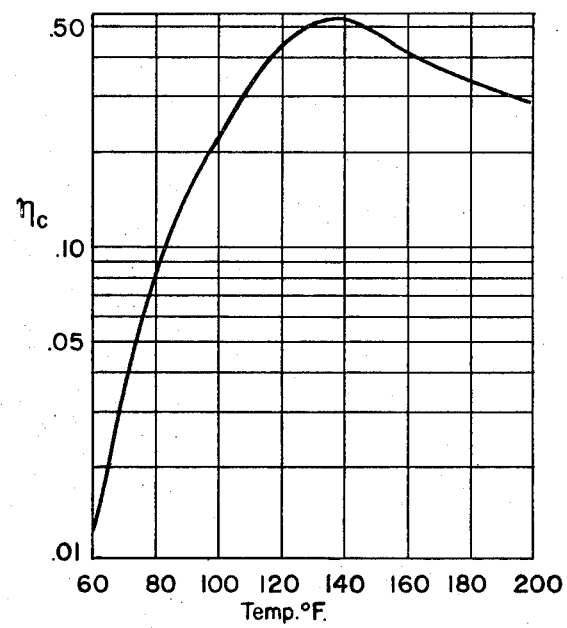

FIG. 7 shows the damping properties of this formulation.

All of the foregoing formulations were made on a two roll rubber mill. The polymer, plasticizer, and filler were weighed in the proper proportions and added directly to the mill. The mill rolls were normally heated (100–250° F. depending on the particular formulation) to effect fusion of the polymer and plasticizer.

Example 5, a solvent based system for spray application was made as above and subsequently dissolved in the methylene chloride (solvent). It can also be made by directly adding the solid ingredients to the solvent and mixing them all together in an internal type mixing machine (Baker-Perkins Mixer).

Samples for testing were fabricated by bonding the coating (or core) directly to the metal substrate(s) under heat and pressure in a mold. Samples were cooled under pressure before removing from the mold to prevent distortion. Other processing methods are possible (ex. calendering, spraying, trowelling, extruding, etc.). All samples were tested for dynamic damping properties on a Bruel and Kjaer Complex Modulus Apparatus Type 3930.

Dielectric loss behavior can be used to study polymer structure effects on molecular motion. It is known that polymethyl methacrylate has two loss peaks, designated as the $\alpha$- and the $\beta$-peaks. The $\alpha$-peak occurs at the higher temperature and was attributed to the motion involving the main chain of the polymer. The $\beta$-peak at the lower temperature was assigned to motion involving the polar ester side group attached to the main polymer chain. It is also known that the same molecular process, the $\alpha$-process, was responsible for the $\alpha$-loss peak occurring in the main glass transition zone as determined by dynamic mechanical and dielectric testing. We have found that a study of the $\alpha$-process by dielectric methods can provide useful information on the chain dynamics associated with dynamic mechanical behavior, particularly in polymeric materials based on methyl methacrylate and its homologs.

In addition, the dielectric method can also provide information on the temperature position and temperature band-width associated with the primary $\alpha$-loss peak and the secondary $\beta$-loss peak.

Figure 8:
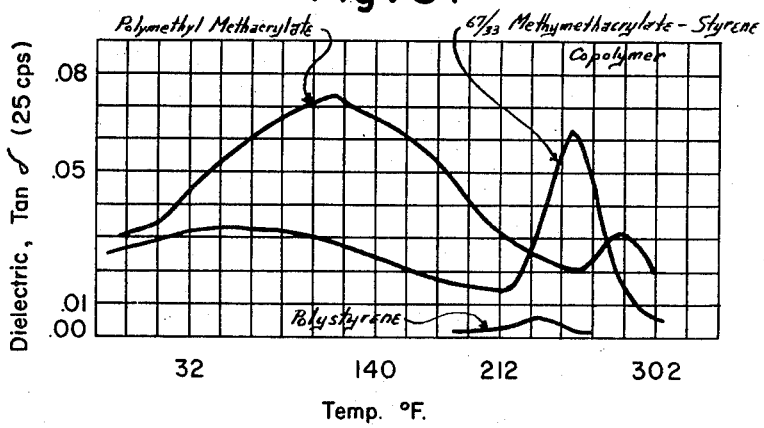
FIGS. 8–11 show comparative curves of dielectric tan δ versus temperature for various materials.

The dielectric loss behavior of the $\alpha$-process in a (67/33) methyl methacrylate-styrene copolymer is particularly striking. This copolymer shows an $\alpha$-process having a dissipation factor (tan $\delta$) peak that is considerably more intense than the $\alpha$-process occurring in polymethyl methacrylate and polystyrene respectively. Such a behavior (resembling a synergistic effect) indicates that the configuration of the copolymer is more favorable for dissipating energy. This example is shown in FIG. 8.

Figure 9:
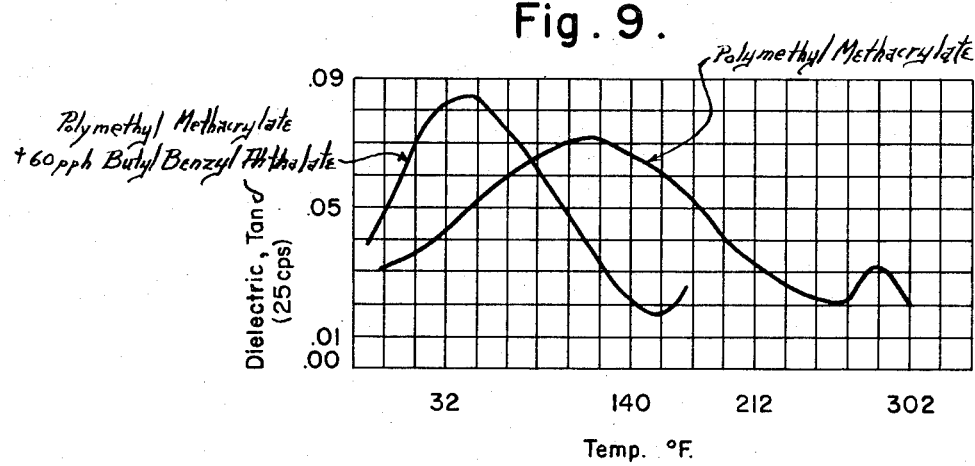

As we have already pointed out the addition of a plasticizer to a polymer affects the intensity and temperature position of the tan $\delta$ peak associated with the $\alpha$-process. In the case of polymers based on methyl methacrylate, the addition of a plasticizer is sufficient to shift the $\alpha$-peak temperature to a lower temperature. If sufficient plasticizer is added, a convergence of the $\alpha$-peak with the lower temperature $\beta$-peak can occur. The tan $\delta$ is increased and the loss curve broadens out considerably in temperature width when this convergence takes place. The merging of the $\alpha$- and $\beta$-peaks also results in a broadening of the temperature bandwidth in dynamic mechanical loss behavior. FIG. 9 compares the dielectric tan $\delta$ of polymethyl methacrylate with and without 60 parts per hundred of butyl benzyl phthalate plasticizer.

Figure 10:
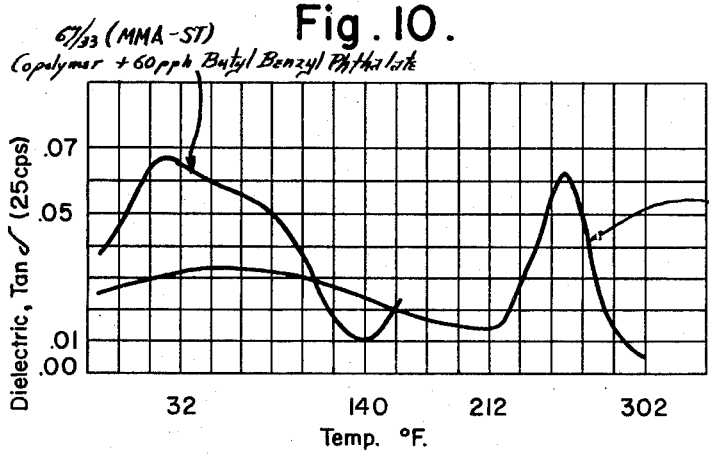
Figure 11:
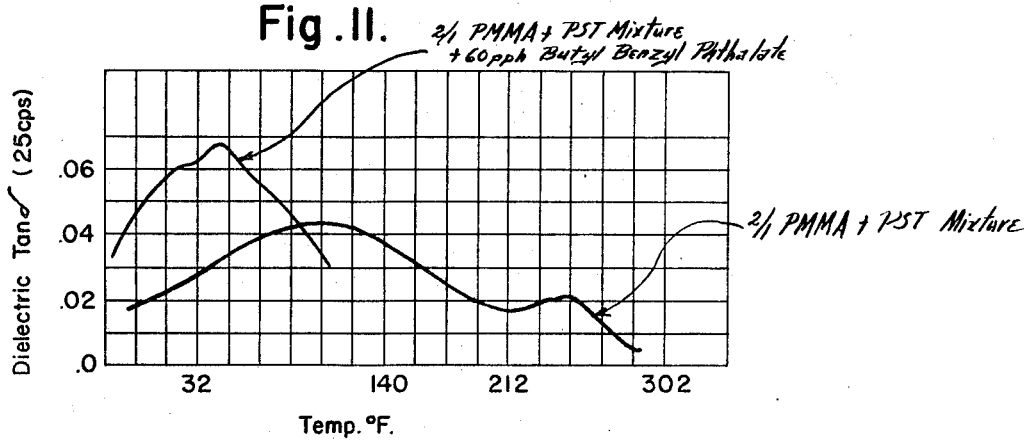

FIG. 10 shows a similar comparison for the (67/33) methyl methacrylate-styrene copolymer. FIG. 11 shows the same comparison for a (2/1) physical mixture of polymethyl methacrylate-polystyrene.

Measurements of D.C. conductivity (resistivity) in polymeric materials through their glass transition zones have been reported. In such previous reports the plots of conductivity (resistivity) vs. temperature show only a change in slope in the glass tranition zone.

We have found that conductivity studies made with dynamic temperature scanning and continuous current monitoring can result in unusual behavior in the glass tranition zone differing from a simple change of slope. In particular, we have encountered examples of inversion and step-like (plateau) behavior in the glass transition zone of polymeric materials based on methyl methacrylate and its homologs.

Figure 12:
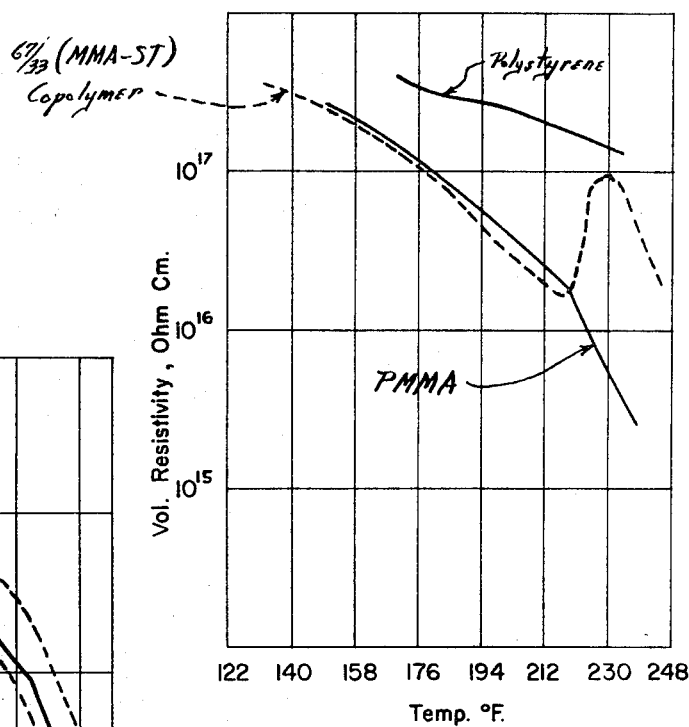
FIGS. 12–13 show curves of volume resistivity versus temperature for various materials.

Our D.C. conductivity studies of the (67/33) methyl methacrylate-styrene copolymer shows up a distinct difference in response in comparison with polymethyl methacrylate and polystyrene. FIG. 12 illustrates this. The (67/33) (MMA–ST) copolymer shows an inversion in the plot in the transition zone.

Figure 13:
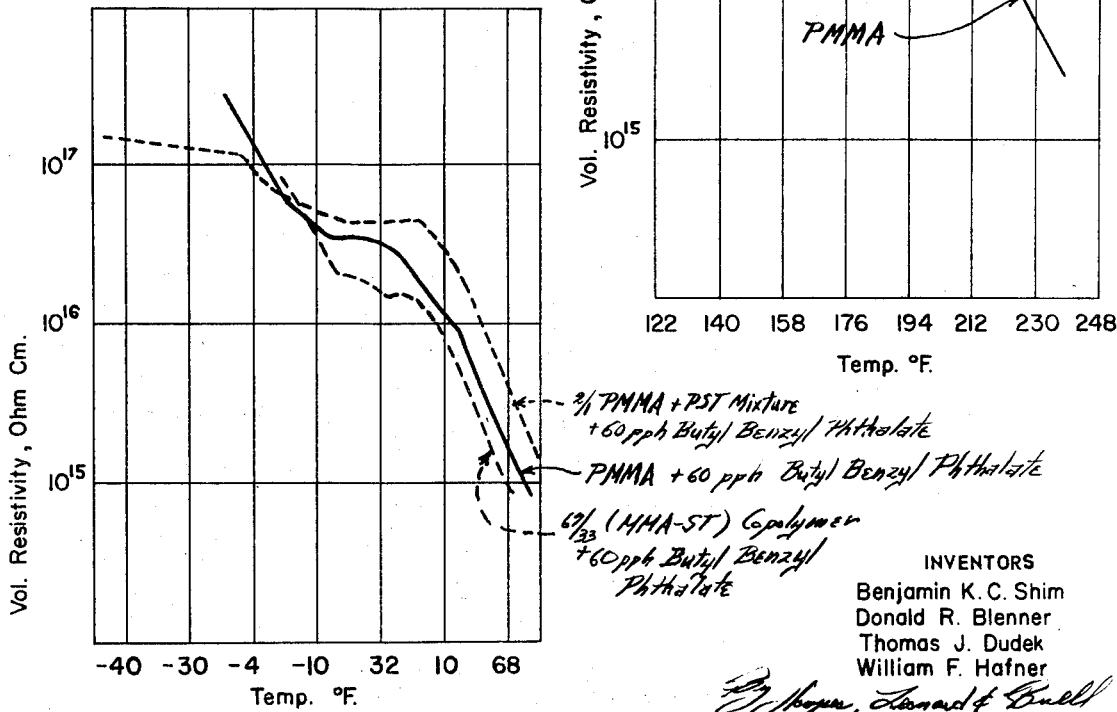

The addition of 60 parts of butyl benzyl phthalate plasticizer to the polymer causes an alternation of the D.C. conductivity behavior. This is shown in FIG. 13. The plasticized (67/33) (MMA–ST) copolymer shows a plot having a broad step-like (plateau) region in the glass transition zone. As in the dielectric case, the addition of plasticizer has shifted the glass transition zone to a lower temperature range. FIG. 13 also shows the curve for plasticized polymethyl methacrylate and the plasticized (2/1) physical mixture of polymethyl methacrylate-polystyrene.

Similar observances of inversions or step-like behavior in the glass transition zone in D.C. conductivity studies under continuous current monitoring have been found in other polymers. These include polyethyl methacrylate poly-n-butyl methacrylate, polyisobutyl methacrylate, polymethyl acrylate, copolymers of methyl methacrylate and methyl acrylate, copolymers of metal methacrylate and butyl methacrylate, copolymers of methyl methacrylate and n-butyl acrylate, terpolymer of methyl methacrylate and styrene.

We interpret these inversions and step behavior as indications of the configurational flexibility of the polar groups in response to the applied electric field as the glass transition zones traversed. Having an inversion or step rather than the simple change in slope of the log resistivity vs. temperature plot found for polymer network. A loosening of the polymer network can be attained by external plasticization or by internal structural plasticization through copolymerization or higher homologs within a family, such as the methacrylates.

We have found that these peculiar properties are characteristic of the materials adapted for use in our invention and can be used to establish materials suitable for use in our invention.

In the practice of our invention we prefer to use polymeric materials having glass and secondary transition points less than 250° F. apart and in most cases less than 200° F.

We have found that the amount of plasticizer should not exceed about 50% of the total mass and preferably should be about 30%. We have found that any conventional plasticizer which will function as a plasticizer for the particular polymer in question may be used.

As a filler in the damping composition of our invention we prefer low density fillers in order to obtain maximum mass/mass coefficient with the metal being dampened. We have found graphite, carbon black, mixtures of graphite and carbon black, silica, talc, and vermiculite to be particularly satisfactory but not limiting in the practice of our invention.

We have found that the polymer to be used in our invention must have two characteristics. It must have some polar functionality and a secondary transition point below $T_g$. We have found the methacrylate and acrylates to be most satisfactory as basic starting materials for our invention.

In the foregoing specifications we have set out certain preferred compositions and practices of our invention, however, it will be understood that this invention may be otherwise embodied within the scope of the following claims.

We claim:

1. In combination a damping layer and a material imparting stiffness thereto selected from the group consisting of constraining layers and fillers, said damping layer comprising a polymeric material selected from the group consisting of homopolymers of methacrylic acid and methacrylic acid esters and copolymers of methacrylic acid esters with acrylic acid esters and methacrylic acid esters with styrene. having polar functionality and in the solid state clearly defined spaced apart glass and secondary transition points less than 250° F. apart admixed with a plasticizer capable of moving the two transition points together to provide a combined transition effect, said layer having a thickness of at least 0.01 inch.

2. A damping material as claimed in claim 1 having added thereto a filler imparting stiffness thereto.

3. A damping material as claimed in claim 1 wherein the polymeric material is sandwiched between constraining layers which impart stiffness thereto.

4. Damping material as claimed in claim 1 wherein the polymer is polymethyl methacrylate.

5. Damping material as claimed in claim 1 wherein the polymer is polymethacrylic acid.

6. Damping material as claimed in claim 1 wherein the polymer is polyethyl methacrylate.

7. Damping material as claimed in claim 1 wherein the polymer is a copolymer of a homolog of the methacrylate series and styrene.

8. Damping material as claimed in claim 1 wherein the polymer is a copolymer of homologs of the methacrylate series having glass and secondary transition points within 250° F. of each other.

9. In combination a damping layer and a material imparting stiffness thereto selected from the group consisting of constraining layers and fillers, said damping layer comprising a polymeric material selected from the group consisting of methacrylate, acrylate and methacrylate ester polymers and copolymers having polar functionality and in the solid state clearly defined spaced apart glass and secondary transition points admixed with a plasticizer capable of moving the two transition points together to provide a combined transition effect, said layer having a thickness sufficient to effect a loss factor of 0.1 or greater over a 69° to 86° F. temperature spread.

10. A damping material comprising in combination with a material imparting stiffness thereto at least one polymeric material of the methacrylate series and a plasticizer capable of moving the glass and secondary transition points of the methacrylate polymer together to provide a combined transition effect.

11. Damping material comprising in combination a polymeric material between constraining layers which impart stiffness thereto, said polymeric material being at least one member of the methacrylate series having polar functionality and in the solid state clearly defined spaced apart glass and secondary transition points and a plasticizer capable of moving the glass and secondary transition points of the methacrylate polymer together to form a combined transition effect.

References Cited

UNITED STATES PATENTS

| 2,934,510 | 4/1960 | Crissey et al. | 260—31.8 |
| 3,170,887 | 2/1965 | Ramos | 260—28 |
| 3,194,777 | 7/1965 | Christenson et al. | 260—31.8 |
| 3,399,103 | 8/1968 | Salyer et al. | 260—41 |
| 3,399,104 | 8/1968 | Ball et al. | 260—899 X |
| 3,071,217 | 1/1963 | Gould | 161—218 |
| 3,271,188 | 9/1966 | Albert et al. | 117—132 C |

MORRIS LIEBMAN, Primary Examiner

L. T. JACOBS, Assistant Examiner

U.S. Cl. X.R.

117—132; 161—165, 216; 260—41

UNITED STATES PATENT OFFICE
CERTIFICATE OF CORRECTION

Patent No. 3,634,299         Dated  January 11, 1972

Inventor(s) Benjamin K. C. Shim, et al

It is certified that error appears in the above-identified patent and that said Letters Patent are hereby corrected as shown below:

Column 4, line 31, "bandwith" should read -- bandwidth --. Column 5, line 38, "constained" should read -- constrained --. Column 6, line 45, "tranition" should read -- transition --; line 49, "tranition" should read -- transition --. Column 7, line 2, "metal" should read -- methyl --; line 5, after "late" insert -- , methylacrylate --; line 9, "zones" should read -- zone --; same line after "zone" insert -- is --; line 11, after "for" insert -- polymethyl methacrylate is interpreted in terms of a looser --; line 30, "low" should read -- lower --; line 55, after "styrene" delete the period.

Signed and sealed this 14th day of November 1972.

(SEAL)
Attest:

EDWARD M. FLETCHER, JR.
Attesting Officer

ROBERT GOTTSCHALK
Commissioner of Patents